United States Patent

[11] 3,573,585

| [72] | Inventor | John C. Taylor<br>Otters 'Ole, Market St., Buxton, England |
|---|---|---|
| [21] | Appl. No. | 821,813 |
| [22] | Filed | May 5, 1969 |
| [45] | Patented | Apr. 6, 1971 |
| [32] | Priority | May 15, 1968 |
| [33] | | Great Britain |
| [31] | | 23157/68 |

[54] INTERMITTENT WINDSHIELD WIPER MOTOR CONTROL
4 Claims, 7 Drawing Figs.

| [52] | U.S. Cl. | 318/443,<br>318/472, 15/250.12 |
|---|---|---|
| [51] | Int. Cl. | B60s 1/08 |
| [50] | Field of Search | 318/443,<br>444, 471, 472; 15/250.12, 250.17 |

[56] References Cited
UNITED STATES PATENTS

| 3,487,492 | 1/1970 | Bischoff | 318/443 |

FOREIGN PATENTS

| 230,220 | 3/1925 | Great Britain | 15/250.12 |
| 1,085,629 | 10/1967 | Great Britain | 318/443 |
| 1,517,097 | 2/1968 | France | 15/250.12 |

Primary Examiner—Oris L. Rader
Assistant Examiner—Robert J. Hickey
Attorney—Bacon and Thomas ABSTRACT: Control means for a vehicle windscreen wiper including an operating mode, for use in light rainfall for example, in which the wiper operates intermittently under the control of a thermally sensitive switch actuated by an auxiliary heater to interrupt the power supply to the wiper upon actuation of the switch with rising temperature and to restore the power supply upon actuation with falling temperature; energization of the switch actuating heater is continued during each cycle until the wiper parks.

Patented April 6, 1971  3,573,585

INVENTOR
JOHN C. TAYLOR
BY
Bacon & Thomas
ATTORNEYS

INVENTOR
JOHN C. TAYLOR
BY
Bacon & Thomas
ATTORNEYS

INTERMITTENT WINDSHIELD WIPER MOTOR CONTROL

This invention relates to electrically operated windscreen wipers of vehicles, particularly but not exclusively road vehicles, and is particularly concerned with the provision of improved controls therefor.

Electrically operated windscreen wipers of road vehicles can deal effectively, by their continuous operation, with most conditions of moderate or heavy rain or snowfall. However, when comparatively light rain is falling, or when a fine spray is being thrown on to the windscreen from a wet road by the wheels of other vehicles after the rain has ceased, such continuous operation of the windscreen wipers frequently has the effect of smearing the windscreen and thus decreasing its transparency. Even two-speed windscreen wipers have this effect at their lower speed, which is designed to deal with moderate rainfall.

It is a primary object of the present invention to provide means whereby this disadvantage may be overcome or considerably reduced.

Thus according to the invention there is provided, in a vehicle having an electrically driven windscreen wiper provided with automatic parking means for causing the wiper to be driven to and to stop in a predetermined parking position when the supply of power for the operation of the wiper is interrupted, control means for said wiper including a first operating circuit for continuous operation of the wiper and a second operating circuit for operating the wiper intermittently, and means for selecting one or other of said circuits, said second circuit including a thermally-controlled snap-acting switch operable to interrupt the supply of power to said wiper with rising temperature and to restore power with falling temperature, an electrical heater being provided in said second circuit to effect intermittent operation of said switch, and the arrangement being such that during each cycle of such intermittent operation the energization of the said heater is continued until the wiper has returned to its said parking position.

The windscreen wiper is thus operable in two different fashions. When it is driven via the said first operating circuit it will operate continuously in the conventional manner. Upon selecting the second operating circuit, however, the wiper will first be operated whilst the said thermally-controlled switch is closed and is being heated up by the said heater. When the switch operates with rising temperature the wiper will stop once it has reached its parking position. The switch then cools until it operates with falling temperature to remake the circuit and thus restart the wiper so that a new cycle commences. It will be understood that the said first operating circuit may if desired still include means for driving the wiper continuously at both fast and slow speeds.

The arrangement of the said heater in such manner that its energization is continued until the wiper parks, rather than its being deenergized simultaneously with the operation of the said switch with rising temperature, provides two principal advantages.

Firstly, the fact that the cooling of the thermally-controlled switch does not commence until the wiper has stopped in its parking position ensures a time delay before the next cycle is begun by the operation of the switch with falling temperature; it will be understood that (although such an effect would never be intended) a malfunction of the switch could otherwise cause it to operate with falling temperature before the wiper had parked, with the result that the wiper would operate continuously.

Secondly, and more important, the arrangement provides for a self-compensating effect dependent on the rate at which water is accumulating on the windscreen. It will be appreciated that it is desirable that the length of the time delay between successive cycles of operation of the wiper should be an inverse function of the "wetness" of the screen, i.e. the wetter the screen the shorter the time delay. The speed of movement of the wiper is affected by the wetness of the windscreen, as frictional drag causes the wiper to move more slowly when the screen is comparatively dry than when it is comparatively wet. The time which elapses between the operation of the thermally-responsive switch with falling temperature (to start the wiper) and its operation with rising temperature is, however, substantially constant. As a result the period of time between the operation of the switch with rising temperature and the arrival of the wiper at its parking position will vary as an inverse function of the wetness of the screen; the dryer the screen, the longer will such period be. The heater continues to operate during such period; thus the dryer the screen, the longer will be the period of operation of the heater and consequently the higher will be the temperature to which the thermally-responsive switch is raised and, as a final consequence, the longer will be the period (which is the time delay between cycles) during which the switch is cooling to that temperature at which it reactuates the wiper. Thus the length of the time delay is an inverse function of the wetness of the screen, as is desirable.

It will be appreciated that various different circuit arrangements may be employed in control means according to the invention. It is generally preferred to arrange the heater in parallel with the wiper driving motor and in series with the said parking means so that the heater will be energized via the said parking means whilst the wiper is being driven to its said parking position under the influence of the parking means in operation.

In one circuit arrangement, which is particularly suitable when the wiper driving motor is a permanent magnet motor, the said thermally-controlled switch is a single-pole changeover switch, the movable contact of the switch being connected in series both with said heater and with the wiper motor, a first fixed contact of the switch which the movable contact engages upon operation of the switch with falling temperature being arranged to be connected to a source of electrical power during operation of the wiper via said second circuit, and the second fixed contact of the switch being arranged to be connected to such power source via the said parking means during such operation. The control means may then include a three-pole changeover switch for selection said first or second circuit, the arrangement being such that when said second circuit is selected a first pole of such switch makes the connection between the power source and said first fixed contact, a second pole makes the connection between the parking means and said second fixed contact, and the third pole makes a connection between said heater and earth.

When the wiper motor is a wound-field motor the said thermally-controlled switch may conveniently be a single pole on-off switch connected in series with the said heater and in parallel with both the wiper driving motor and the said parking means. The control means may then include a two-pole changeover switch for selecting said first or second circuit, the arrangement being such that when said second circuit is selected a first pole of such switch makes a connection from an electrical power source to the said heater and thermally-controlled switch, whilst the second pole of the switch makes the series connection between the heater and the parking means in parallel with the wiper motor.

The said heater may be associated with the thermally-controlled switch to influence the same in any convenient fashion. Thus it may if desired by physically separate from the thermally-responsive actuating member of the switch but mounted adjacent the same, or it could comprise a heater wire wound on the said member. In a preferred embodiment a heater coil is mounted to extend parallel to but slightly spaced from the thermally-responsive actuating member which latter takes the form of a stressed snap-acting bimetal strip or plate. One form of snap-acting member that is very suitable for this purpose is one which comprises a substantially E-shaped strip or sheet of bimetal having a central tongue flanked by two outer legs the free ends of which legs are interconnected opposite the free end of the tongue, such strip or sheet being deformed out of its original plane by drawing together the free ends of the legs so as to form a differentially stressed system which upon changes of temperature is movable with a snap action between two positions one on each side of an intermediate unstable position.

When a thermally-responsive actuating member of the above kind is incorporated in the switch in the said second circuit, a movable contact of the said switch may be mounted on the free end of the said tongue so as to be movable between positions to "make" and "break" the power supply to the wiper upon snapping of the said strip or plate between its said two positions. Depending upon its intended manner of operation in such circuit the switch with may, as already mentioned, comprise a simple circuit-breaker (i.e. with one fixed contact), or a changeover switch with two fixed contacts arranged to be engaged alternately by the said movable contact when the bimetal switch actuating member is in the respective positions between which it moves with changes of temperature.

It will be appreciated that in wiper control means according to the invention accurate setting of the "reset time" of the bimetal actuating member of the thermally-controlled switch, i.e. the time taken by such member to cool through its temperature differential after having operated with rising temperature, is important, because this period must be of such duration as to ensure that the windscreen wiper is stopped for a desired period, e.g. about 5 seconds, in its parking position before each new cycle commences. Preferably, therefore, the thermally-controlled switch of the control means incorporates means operable to adjust the reset time of the switch, whereby such reset time may be accurately set during the manufacture of the switch.

The temperature differential of a bimetal actuating member of the kind described above, i.e. the difference between the temperature at which such member operates with rising and falling temperature, depends upon the stress present in the bimetal sheet or strip resulting from the drawing together of its outer legs; the greater the stress, the greater is the temperature differential. The rate of cooling of such actuating member through its temperature differential once it has operated with rising temperature depends upon the elevation of that operating temperature above ambient, and such operating temperature depends upon the degree of deformation of the sheet or strip, which deformation is of course also brought about by the drawing together of the legs.

Therefore, where the switch incorporated in the control means of the invention is of the preferred kind already described, the said adjusting means will be such as to permit adjustment of the extent to which the said outer legs of the bimetal actuating member are drawn together. The said adjusting means will then provide a facility whereby, during the setting of the bimetal actuating member by the manufacturer, its temperature differential may be reduced whilst at the same time its mean operating temperature may be increased, and it will be understood that such adjustments are additive in reducing the reset time of the bimetal member with falling temperature. Thus in the manufacture of the switch, having first set the actuating member to a temperature differential and mean operating temperature which will give a reset time known to be greater than what is required, accurate adjustment of such reset time to a desired value is effected by a single operation of the said adjusting means; such operation will be effective to move the said outer legs further apart to a selectable degree, so as to reduce the stress in the bimetal member and at the same time to twist the outer legs and thereby to increase the degree of deformation of the bimetal member so as to increase the temperature at which it operates with rising temperature.

In a preferred embodiment of the invention the said adjusting means comprises a screw interconnecting the said outer legs of the bimetal member adjacent their ends, for example via a pair of lugs provided one on each of such legs and extending at right angles to the general plane of the bimetal strip or sheet.

In order that the invention may be more readily understood two embodiments thereof, together with a thermally-controlled switch suitable for use in both of said embodiments, will now be described by way of example and with reference to the accompanying drawings, in which:

FIG. 5 is a longitudinal medial cross section of such switch showing it in its "cold" condition;

FIG. 6 is a cross section similar to FIG. 5 but showing the switch in its "hot" condition; and FIG. 7 is an underneath perspective view of the switch.

Figure 1:
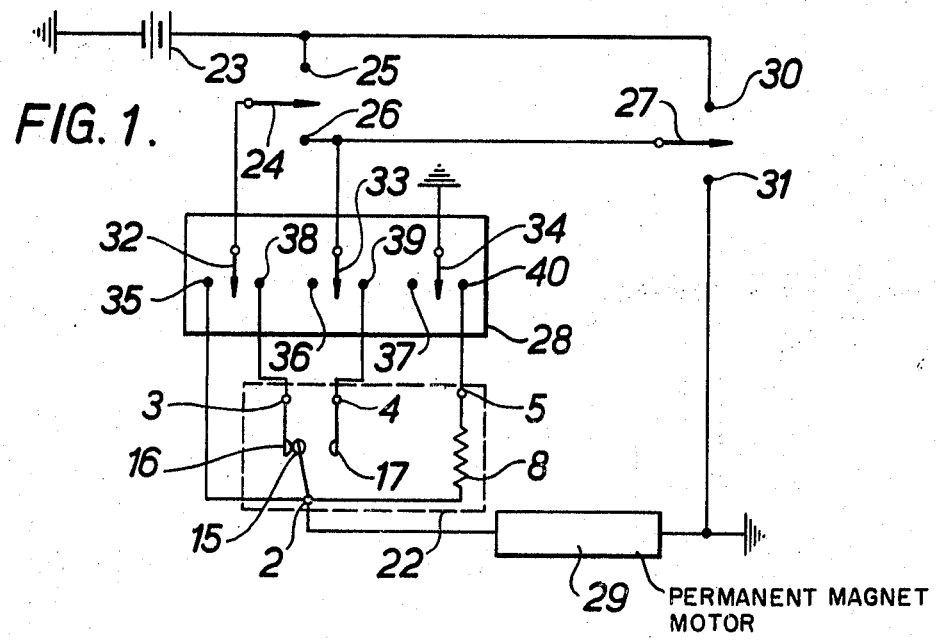
FIG. 1 is a circuit diagram of a first embodiment of control means for a vehicle windscreen wiper according to the invention.

The thermally-controlled switch illustrated in FIGS. 3 to 7 of the drawings will first be described. The switch comprises a rectangular baseplate 1 formed of insulating plastics material in which are embedded four terminal posts 2 to 5 formed of copper-coated steel rod; the terminal posts are secured in the plastics baseplate by splines on the imbedded portions of such posts, which bite into the walls of the cylindrical holes receiving them.

Mounted on the top surface of the baseplate 1 is a metal mounting member 6 which is electrically connected by spot welding to the terminal post 2 and provides a mounting for both a thermally-sensitive actuating member 7 of the switch and a heater 8 for operating such actuating member. The switch actuating member 7 comprises a substantially E-shaped sheet of bimetal formed with a central tongue 9 flanked by two outer legs 10 and 11. The free ends of the outer legs 10 and 11 are spot welded to respective flanges of a pair of arms 12 and 13 of the support member 6. Immediately beneath the flanges which carry the bimetal member, the arms 12 and !3 of the support member 6 are interconnected by a screw 14 so that, by operation of the screw, the spacing between the free ends of the arms 12 and 13 can be adjusted. In the condition of use of the switch the arms 12 and 13 are drawn together somewhat so as similarly to draw together the free ends of the outer legs 10 and 11 of the bimetal member, whereby to deform and stress such member so that it will snap with changes in temperature between two positions one on each side of an intermediate unstable position. The screw 14 provides for adjustment of the stress in the bimetal sheet, and of its degree of deformation, during manufacture of the switch so that its reset time may be accurately set in the manner already described herein.

The central tongue 9 of the bimetal member carries a double-ended movable contact 15 of the switch, and it will be understood that the snapping of the bimetal member between its said two positions with changes in temperature will bring about a corresponding movement of the contact 15 between a "cold" position (shown in FIG. 5) and a "hot" position (shown in FIG. 6).

When the contact 15 is in its "cold" position it engages a fixed contact 16 provided on the top end of the terminal post 3. In its "hot" position the movable contact engages a fixed contact 17 formed at the end of one arm of a bracket 18 mounted on the baseplate via the terminal post 4.

The heater 8 comprises a wire coil connected between an upstanding arm 19 of the mounting member 6 and a further upstanding arm 20 of a bracket 21 the other end of which is electrically connected to the terminal post 5 by spot welding.

It will thus be seen that in the "cold" condition of the switch a connection is made between the terminal post 2 and the terminal post 3 via the bimetal actuating member 7 and the contacts 15 and 16, whilst in the "hot" condition a connection is made between the terminal post 2 and the terminal post 4 via the member 7 and the contacts 15 and 17.

Referring now to the first embodiment of the invention illustrated, by way of a circuit diagram, in FIG. 1 of the drawings, the switch of FIGS. 3 to 7 is shown in such diagram in diagrammatic form within the outline 22; it will be seen that the contacts 15,16 and 17 of the switch, the heater 8 and four terminal posts 2 to 5 are all indicated within the outline 22. The switch is shown diagrammatically in its "cold" condition, with the contacts 15 and 16 in engagement.

The circuit of FIG. 1 includes an electrical power source in the form of a battery 23; a main on/off 24 having an "on" contact 25 and an "off" contact 26, parking means in the form of a conventional parking device 27, a three-pole changeover switch generally indicated at 28 and a windscreen wiper driving motor 29 which is a permanent magnet motor. For the sake of clarity the parking device 27 is shown in diagrammatic form as having a "run" terminal 30 and a "park" terminal 31; it should be understood, however, that the device will in fact comprise a conventional rotary mechanism engaged by a brush and having a cutout or a nonconducting portion which, when engaged by the brush, causes the wiper driving circuit to be broken.

It will be seen that the movable contact of the main on/off switch 24 is connected to a first pole 32 of the switch 28, whilst the "off" contact 26 of the on/off switch is connected between a second pole 33 of the switch 28 and the movable contact of the parking device 27. The third pole 34 of the switch 28 is connected to earth. One fixed contact 35 of the first pole of the switch 28 is connected to terminal post 2 of the switch 22; the corresponding fixed contacts 36 and 37 of the other two poles of the switch 28 have no connections. The fixed contact 38 of the first pole 32 of the switch 28 is connected to terminal post 3 of the switch 22, the fixed contact 39 of the second pole is connected to terminal post 4, and lastly the fixed contact 40 of the third pole is connected to terminal post 5 of the switch 22.

For continuous operation of the windscreen wiper the changeover switch 28 will be set so that its movable contacts engage fixed contacts 35,36 and 37; the main on/off switch will, of course, be on. Power will then be supplied to the wiper motor 29 via contacts 25, 24, 32, 35 and terminal post 2 of the switch 22. The wiper will thus operate continuously until the main on/off switch is switched off; power will then continue to be supplied to the wiper motor via contacts 30, 27, 26, 24, etc., until the wiper reaches its parking position and the power circuit is broken by the movement of contact 27 to engage contact 31. It will be observed that a short circuit is then set up through the motor but excluding the power source so that the motor is quickly braked to a standstill.

For intermittent operation of the windscreen wiper the changeover switch will be set so that its movable contacts engage fixed contacts 38,39 and 40; the main on/off switch will again be on. Upon the selector switch 28 being adjusted to this condition the power supplied to the wiper motor 29 will be via contacts 25,24,32 and 38, terminal post 3, contacts 16 and 15 and terminal post 2; at the same time the heater 8 will be energized in a circuit including terminal post 2, terminal post 5, and contacts 40 and 34. Thus the bimetal actuating member 7 of the switch 22 will be heated by the heater 8 until it operates the with rising temperature so that the movable contact 15 snaps over to the "hot" fixed contact 17. A circuit providing power for parking the wiper will now be made via contacts 30, 27, 33, and 39, terminal post 4, contacts 17 and 15, and terminal post 2, until such time as the wiper reaches its parking position and the movable contact 27 of the parking device switches to the contact 31 to break the driving circuit and set up a short circuit to stop the wiper motor. Whilst the wiper is moving to its parking position the heater 8 is still energized via terminal post 2 in the same manner as it was whilst the switch 22 was in its "cold" condition. However, upon the driving circuit being broken by the parking device as above described, the circuit through the heater is also broken so that the bimetal actuating member of the switch 22 will now be permitted to cool through its temperature differential until the movable contact 15 snaps back into engagement with the "cold" contact 16 to commence a new cycle.

It will thus be seen that the heater of the switch 22 continues to operate during the movement of the wiper to its parking position, with the advantages already described herein.

It will be appreciated that the switches 24 and 28 of the control means of FIG. 1 may conveniently be ganged so as to provide a single control switch having "on," "off " and "intermittent" positions.

Figure 2:
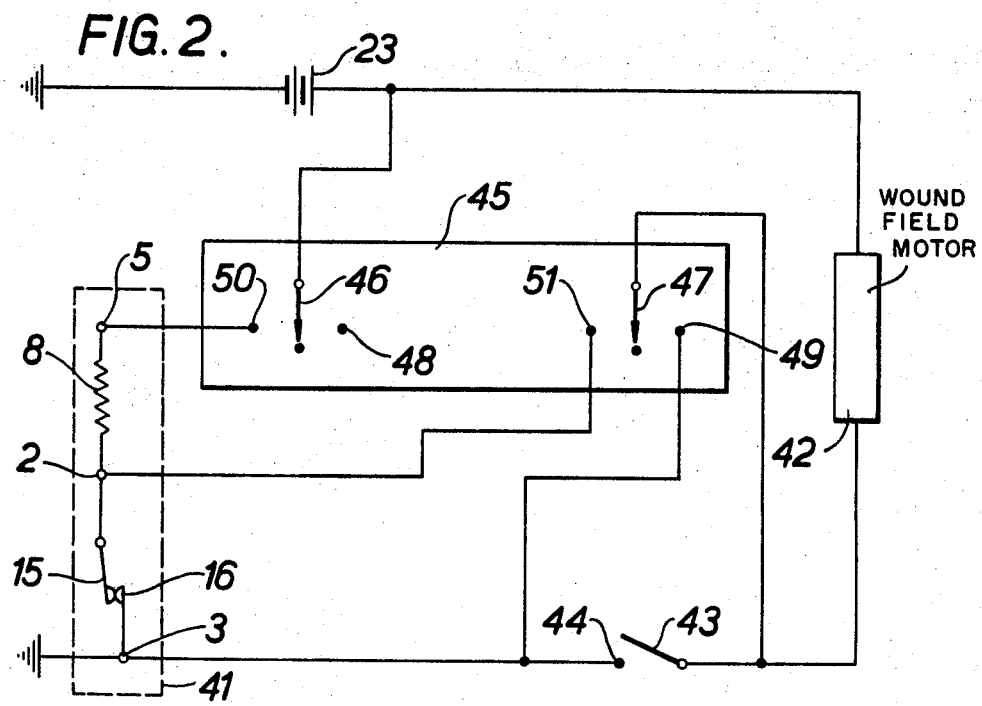
FIG. 2 is a circuit diagram of a second embodiment.
Figure 3:
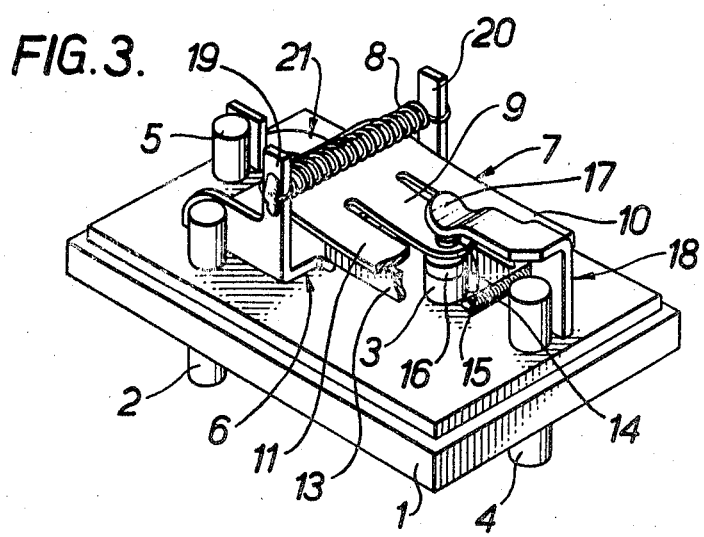
FIGS. 3 and 4 are top perspective views of a thermally-controlled switch for use in the circuits of FIGS. 1 and 2.
Figure 4:
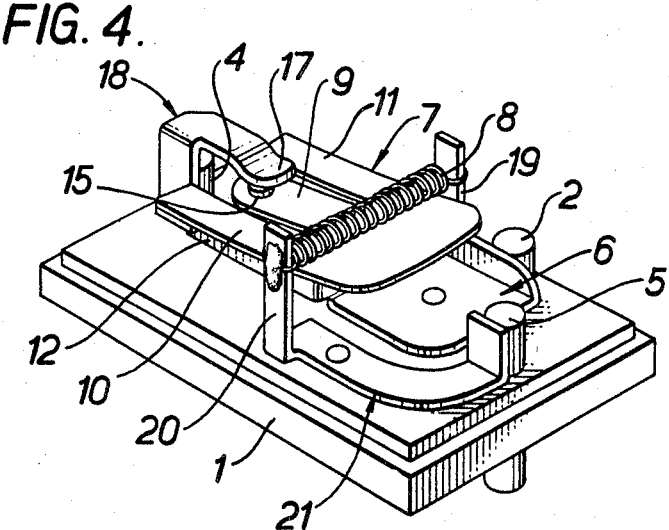

Referring now to the second embodiment of the invention illustrated in FIG. 2 of the drawings, in this embodiment the switch of FIGS. 3 to 7 is indicated diagrammatically within the outline 41. In this embodiment the wiper motor 42 is a field-wound motor and the switch 41 is employed only as an on/off switch rather than as a changeover switch as in the embodiment of FIG. 1. As a result the terminal 4 is not employed in the circuit of FIG. 2, although the "hot" contact 17 of the switch is still of use as a stop which defines the position of the movable contact 15 in its "hot" condition. Thus, in this embodiment, only the terminal posts 2,3 and 5 are shown within the outline 41 indicating the switch, together with the heater 8 and the contacts 15 and 16.

In this embodiment the parking device is shown, for the sake of clarity, as a simple on/off switch having a movable contact 43 and an "on" contact 44; it will be understood, however, that the device will again be of a conventional kind as briefly described in connection with the embodiment of FIG. 1.

The circuit includes a two-pole changeover selector switch 45 which also acts as an on/off switch for the whole system. Thus the poles 46 and 47 of the switch 45 have "off" positions in which they are illustrated, and are engageable with fixed terminals 48 and 49 respectively for continuous operation of the wiper, and 50 and 51 respectively for intermittent operation.

When the wiper is to operate continuously in the conventional fashion the circuit from the battery 23 to earth via wiper motor 42 will be via contacts 47 and 49 and terminal post 3 of the switch 41. Upon the switch 45 being adjusted to "off" the circuit for driving the motor whilst the wiper moves to its parking position will be via contacts 43 and 44 and terminal post 3, until the parking switch opens to break the circuit.

Upon intermittent operation being selected by adjustment of the switch 45 for its poles to engage contacts 50 and 51 respectively, the wiper motor will be powered by a circuit including contacts 47 and 51, terminal post 2 of switch 41, contacts 15 and 16 and terminal post 3. At the same time the heater 8 of the switch 41 will be energized via contacts 46 and 50, terminal post 5, terminal post 2, etc. The bimetal actuating member of the switch 41 will now be heated by the heater 8 until it snaps to its "hot " condition to break the connection between contacts 15 and 16. As a result the circuit through contacts 15 and 16 which previously powered the wiper motor will be broken, but the motor will continue to operate in a circuit including the parking device until the latter device operates to break the circuit. At the same time, the energization of the heater 8 is continued via a circuit including contacts 46 and 50, terminal posts 5 and 2, contacts 51 and 47, and the parking device; the heater will thus continue to be energized until the parking device operates to break the latter circuit when the wiper reaches its parking position. Deenergization of the heater 8 then permits the bimetal actuating member of the switch 41 to cool through its temperature differential until it snaps to its "cold" condition and the contacts 15 and 16 remake to commence a new cycle.

It will thus be understood that, as in the first embodiment, the energization of the heater 8 is continued whilst the wiper is moving to its parking position, with the advantages previously described herein.

It will thus be seen that the invention provides simple but efficient means for operating a windscreen wiper intermittently. It will of course be understood that although the invention has been described in relation to the operation of a single wiper it also extends to the operation of two or more wipers simultaneously.

I claim:

1. In a vehicle having a windscreen wiper, an electric driving motor for said wiper, and automatic parking means for causing the wiper to be driven to and to stop in a predetermined parking position when the supply of power for the operation of the wiper is interrupted; control means for said wiper motor including a first operating circuit for continuous operation of the wiper motor, a second operating circuit for operating the wiper motor intermittently, and means for selecting one or other of said circuits, said second circuit including: a thermally-controlled snap-acting single-pole changeover switch operable to interrupt the supply of power to said wiper motor with rising temperature and to restore power with falling temperature; an electrical heater connected in said second circuit to effect intermittent operation of said changeover switch, said heater being connected in parallel with the wiper motor and in series with said parking means so as to be energized via said parking means while the wiper is being driven to its said parking position under the influence of the parking means in operation; the movable contact of the said changeover switch being connected in series both with said heater and with the wiper motor, a first fixed contact of the switch which the movable contact engages upon operation of the switch with falling temperature being connected to a source of electrical power during operation of the wiper via said second circuit, and the second fixed contact of the switch which the movable contact engages upon operation thereof rising temperature being connected to said power source via said parking means during said operation.

2. Control means as claimed in claim 1, including a three-pole changeover switch for selecting said first or second circuit, when said second circuit is selected a first pole of such switch making connection between the power source and said first fixed contact, a second pole making connection between the parking means and said second fixed contact, and the third pole making a connection between said heater and earth.

3. Control means as claimed in claim 2, wherein the said wiper is a permanent magnet motor, when the wiper reaches its parking position under the influence of the said parking means in either continuous or intermittent operation, a short circuit containing the wiper motor but disconnected from the power source is created so as to cause braking of the motor.

4. Control means as claimed in claim 1, wherein the said thermally-controlled switch incorporates a snap-acting bimetal switch actuating member comprising a substantially E-shaped strip or sheet of bimetal having a central tongue flanked by two outer legs the free ends of which legs are interconnected opposite the free end of the tongue, such strip or sheet being deformed out of its original plane drawing together the free ends of the legs so as to form a differentially stressed system which upon changes of temperature is movable with a snap action between two positions one on each side of an intermediate unstable position, and the movable contact of the switch being mounted on the free end of the central tongue of such member and an adjusting screw interconnecting the free ends of the said outer legs of the bimetal member.